United States Patent [19]

McIntyre

[11] Patent Number: 5,546,156
[45] Date of Patent: Aug. 13, 1996

[54] CAMERA WITH POINTING AID

[75] Inventor: Dale F. McIntyre, Honeoye Falls, N.Y.

[73] Assignee: Eastman Kodak Company, Rochester, N.Y.

[21] Appl. No.: 201,827

[22] Filed: Feb. 25, 1994

[51] Int. Cl.⁶ ................................................. G03B 7/08
[52] U.S. Cl. ........................ 354/400; 354/64; 354/165
[58] Field of Search ............................. 354/64, 165, 402

[56] References Cited

U.S. PATENT DOCUMENTS

| | | | |
|---|---|---|---|
| 3,442,193 | 5/1969 | Cooper et al. | 95/44 |
| 3,866,246 | 2/1975 | Seamons et al. | 3/1.1 |
| 4,367,934 | 1/1983 | Matsui | 354/25 |
| 4,429,967 | 2/1984 | Tokuda et al. | 354/403 |
| 4,523,828 | 6/1985 | Kato | 354/403 |
| 4,623,237 | 11/1986 | Kaneda et al. | 354/403 |
| 4,777,501 | 10/1988 | Caimi et al. | 354/64 |
| 4,827,302 | 5/1989 | Takahasi | 354/403 |
| 4,918,476 | 4/1990 | Tejima | 354/221 |
| 4,935,613 | 6/1990 | Ishiguro et al. | 250/201.1 |
| 4,983,017 | 10/1990 | Schneiter et al. | 356/1 |
| 5,038,162 | 8/1991 | Tejima | 354/221 |
| 5,039,183 | 8/1991 | Meyers | 359/17 |
| 5,070,509 | 12/1991 | Meyers | 372/45 |
| 5,189,463 | 2/1993 | Capper et al. | 354/403 |
| 5,286,973 | 2/1994 | Westrom et al. | 250/253 |
| 5,302,997 | 4/1994 | Cocca | 354/432 |

FOREIGN PATENT DOCUMENTS

| | | | |
|---|---|---|---|
| 2252836 | 8/1992 | United Kingdom | G03B 15/035 |
| WO93/13452 | 7/1993 | WIPO | G03B 13/02 |

*Primary Examiner*—Michael L. Gellner
*Assistant Examiner*—Daniel P. Malley
*Attorney, Agent, or Firm*—David A. Howley

[57] ABSTRACT

A camera having a pointing aid emitter that produces a visible beam generally aligned with the optical axis of the camera objective lens such that the visible beam illuminates an object in the scene includes a scene measurement system that measures an aspect of the scene and an emitter controller that adjusts the output power of the pointing aid emitter in accordance with the scene aspect measured by the scene measurement system to reduce power consumption and reduce the risk of damage to the object that is illuminated by the beam. The scene measurement system of the camera preferably comprises an ambient light measuring system of a camera automatic exposure system and a distance measuring system of a camera automatic focus system. The emitter preferably comprises a laser light source that produces a visible laser beam.

43 Claims, 5 Drawing Sheets

CAMERA WITH POINTING AID

BACKGROUND OF THE INVENTION

1. Field of the Invention

This invention relates generally to cameras and, more particularly, to cameras with pointing aids.

2. Description of the Related Art

Cameras serve as image capture devices, taking pictures of an ambient scene through an objective lens. For example, a photographic still camera stores an image, either photo-electronically into memory or photochemically onto a film-strip, when an image capture button, such as a shutter button, is fully depressed. In a still camera, pressing the shutter button causes a shutter to be tripped, which permits light from the scene to pass through the objective lens and fall onto a photodiode array or film strip located at a focal plane of the lens. A video camera or movie camera captures a sequence of images that, when played back, presents the illusion of motion.

A camera user typically looks through a camera viewfinder to aim the camera at a particular point or object in the scene that is of interest. At times, such as under low light conditions or in a crowded scene, it can be difficult to judge the point in the scene on which the camera is directed. At other times, such as when tracking fast moving objects in the scene or when picture taking discretion is desired, it might be desirable to aim the camera without looking through the viewfinder at all.

For these and other reasons, some cameras are provided with a variety of pointing aids that help a camera user determine where in the scene the camera is directed. Generally, the pointing aid comprises a source of visible light whose output beam is substantially aligned with the optical axis of the camera objective lens. If an object in a scene is illuminated with the beam, the camera user is assured that light from the object will be directed through the objective lens and onto the focal plane for image capture. Placing the pointing aid beam on an object of interest can be done with or without looking through the viewfinder.

For example, U.S. Pat. No. 5,189,463 to Capper et al. describes a video camera with a laser pointing device that is said to obviate the need for looking through a viewfinder to aim the camera. British Patent No. 2 252 836 describes a flashlight and photographic camera combination that optionally can include a laser, which is said to emit a beam that is aligned with the camera lens so as to indicate the object of which a photograph will be taken. The laser is said to make it easier to orient the camera lens.

Although such systems permit easier aiming of a camera, the conditions under which the camera is used can vary widely. For example, under bright ambient light conditions, it can be difficult to see the beam and discern the object on which the pointing aid beam is falling. At the same time, the beam should not be so bright that the power source supplying power to the emitter is unnecessarily drained. Thus, it would be desirable to control the output power of the emitted beam so that it is readily discernable to the camera user under a variety of conditions while power consumption is reduced to only that which is necessary.

While it is important that the emitted beam should be sufficiently bright to be readily seen by the camera user, it also is important that the beam not be so extraordinarily bright that it distracts persons or animals in the scene. In addition, it is important that the output power of the beam not be so great that objects, persons, or animals in the scene might be damaged by the beam. For example, if the pointing aid beam were produced by a device such as a laser and the beam were to enter through the pupil of a person or animal in the scene, and if the laser output power was sufficiently great, then the laser beam could possibly cause damage to the retina. Thus, it again would be desirable to permit control over the pointing aid beam output power.

From the discussion above, it should be apparent that there is a need for a camera with a pointing aid beam that is visible under a variety of ambient conditions, does not use excessive power, and reduces the risk of damage or injury to objects, persons, and animals in the ambient scene. The present invention fulfills this need.

SUMMARY OF THE INVENTION

The present invention provides a camera with a pointing aid beam to assist a user in capturing images of a scene, the camera including a pointing aid emitter that produces a visible beam generally aligned with the optical axis of the camera objective lens such that the visible beam illuminates an object in the scene, a scene measurement system that measures an aspect of the scene, and an emitter controller that adjusts the output power of the pointing aid emitter in accordance with the scene aspect measured by the scene measurement system. The output power level of the pointing aid beam is controlled so that the camera user perceives the beam to be of equal brightness over a range of scene aspects, such as ambient light level and camera-to-object distance, so that power consumption by the emitter is reduced, and so that the risk of injury or damage is reduced. In this way, the pointing aid beam is visible under a variety of conditions using minimal power and with reduced risk of damage or injury to objects, persons, and animals in the ambient scene.

In one aspect of the invention, the scene measurement system measures ambient light level and camera-to-object distance. The system can utilize, for example, light level information from an ambient light measuring system of a camera automatic exposure system or can utilize distance information from a distance measuring system of a camera automatic focus system. The output power of the emitter beam can be controlled by the emitter controller in accordance with the ambient light level, as measured by the automatic exposure system, or in accordance with the distance from the camera to an object in the scene, as measured by the automatic focus system. Alternatively, the beam output power can be controlled by the emitter controller in accordance with information from both systems. In any case, the emitter controller controls the beam output power so as to increase the likelihood that the beam is visible to the camera user over varying scene aspects, minimize power consumption, and reduce the risk of damage or injury.

In another aspect of the invention, the pointing aid emitter comprises a laser light source that produces a visible laser beam generally aligned with the optical axis of the camera objective lens such that the laser beam illuminates an object in the scene whose image will be captured through the objective lens. The emitter controller preferably controls the output power of the laser in accordance with both the detected distance to a nearest object and the detected ambient light level. In controlling the laser beam power, the emitter controller adjusts the laser power in a stair-step relationship between output power and both light level and distance. The output power of the laser beam can be controlled advantageously in accordance with a pulse width modulation technique to reduce power consumption and beam exposure.

Other features and advantages of the present invention should be apparent from the following description of the preferred embodiments, which illustrate, by way of example, the principles of the invention.

DESCRIPTION OF THE PREFERRED EMBODIMENTS

Figure 1:
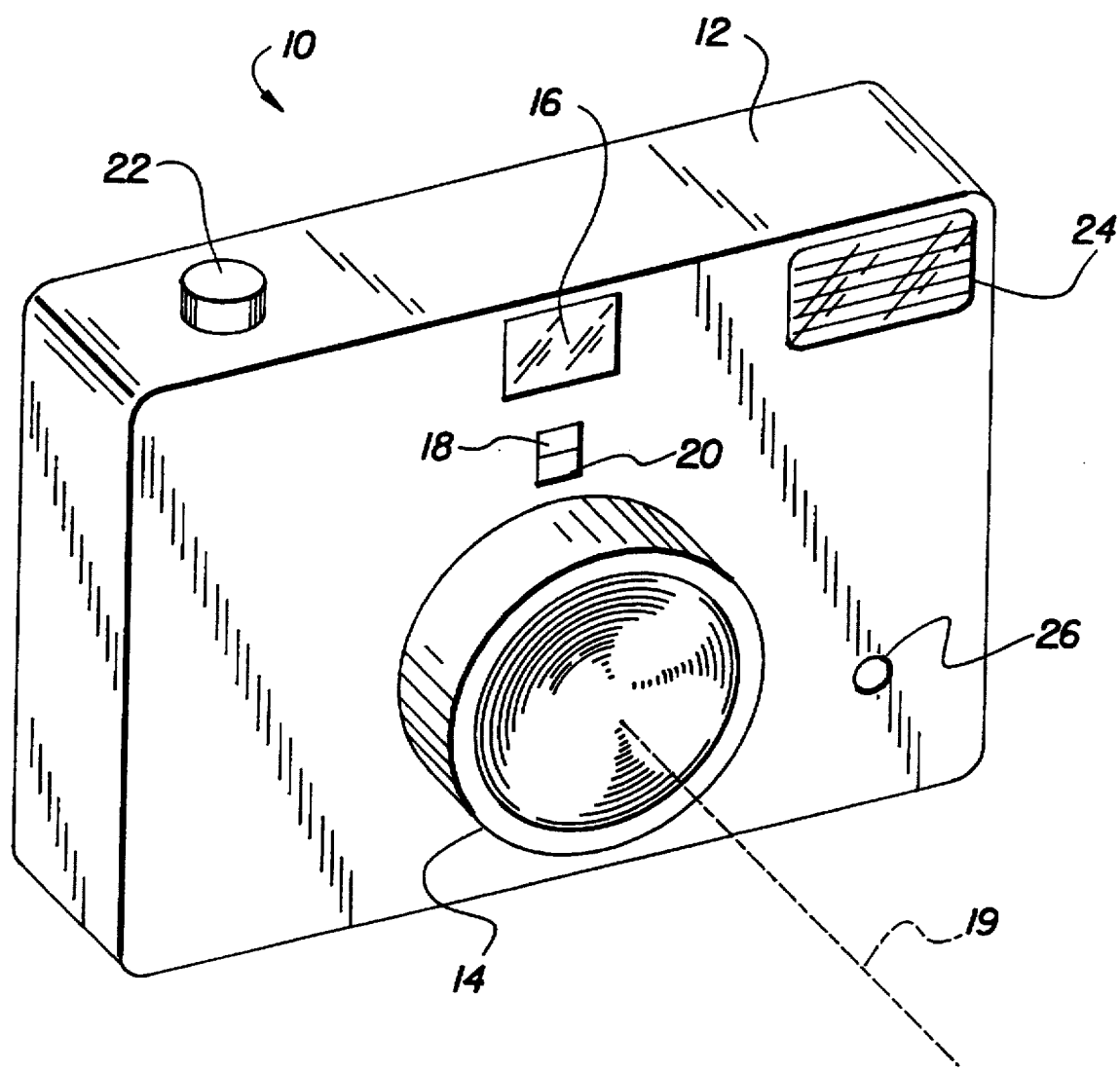
FIG. 1 is a perspective view of a camera constructed in accordance with the present invention.

FIG. 1 illustrates a camera 10 having a camera body 12 in which an objective lens 14 directs light from an ambient scene onto a focal plane for image capture. A camera user can view the scene through a viewfinder 16. The camera includes a pointing aid emitter 18 that produces a visible beam generally aligned with the optical axis 19 of the objective lens such that the visible beam illuminates an object in the ambient scene and appears, for example, as a readily visible small dot on the object. A scene measuring system 20 measures a characteristic or aspect of the scene. The output power of the beam emitted from the pointing aid emitter 18 is adjusted in accordance with the measured scene aspect so as to increase beam visibility, minimize power consumption, and reduce the risk of damage to an object or person in the scene that is illuminated by the beam.

The camera in which the pointing aid is provided can be any one of a variety of image capture devices, such as a still camera that records images into an electronic memory for storage or onto a silver-halide filmstrip for exposure, or a video camera, or a movie film camera. The preferred embodiment will be described with respect to a photographic still camera. The camera 10 includes an image capture button 22 that is used to activate a mechanism of the camera to capture an image of the ambient scene. A flash unit 24 provides supplemental illumination of the scene, if necessary. The output power of the emitter beam can be controlled by an optional adjustment switch 26.

In a still camera, the image capture button 22 is a two-position switch such that pressing the button to a first position activates the pointing aid emitter 18 and pressing the button to a second position deactivates the pointing aid emitter and activates the image capture mechanism of the camera 10. In a still camera, for example, the image capture mechanism comprises a shutter (not illustrated). By deactivating the emitter during image capture, a camera user is ensured that the pointing aid beam will not be visible in the captured image. Those skilled in the art will appreciate that other implementations of emitter control will be necessary for other types of cameras to avoid the presence of the pointing aid beam on objects in the captured images. For example, video cameras likely would have an image capture button that permits the pointing aid beam to be extinguished during actual image recording and to be illuminated during the vertical blanking interval known to those skilled in the art.

The scene aspect that is used to control the pointing aid emitter 18 can assume a variety of measured characteristics. For example, the output power of the pointing aid beam can be controlled according to the detected amount of ambient light in the scene. Alternatively, the output power of the beam can be controlled in accordance with the distance from the camera 10 to an object of interest aligned with the optical axis 19 or to the object nearest the camera. The output power of the beam also can be controlled in accordance with both aspects, that is, the ambient light level and also the distance to the object.

Figure 2:
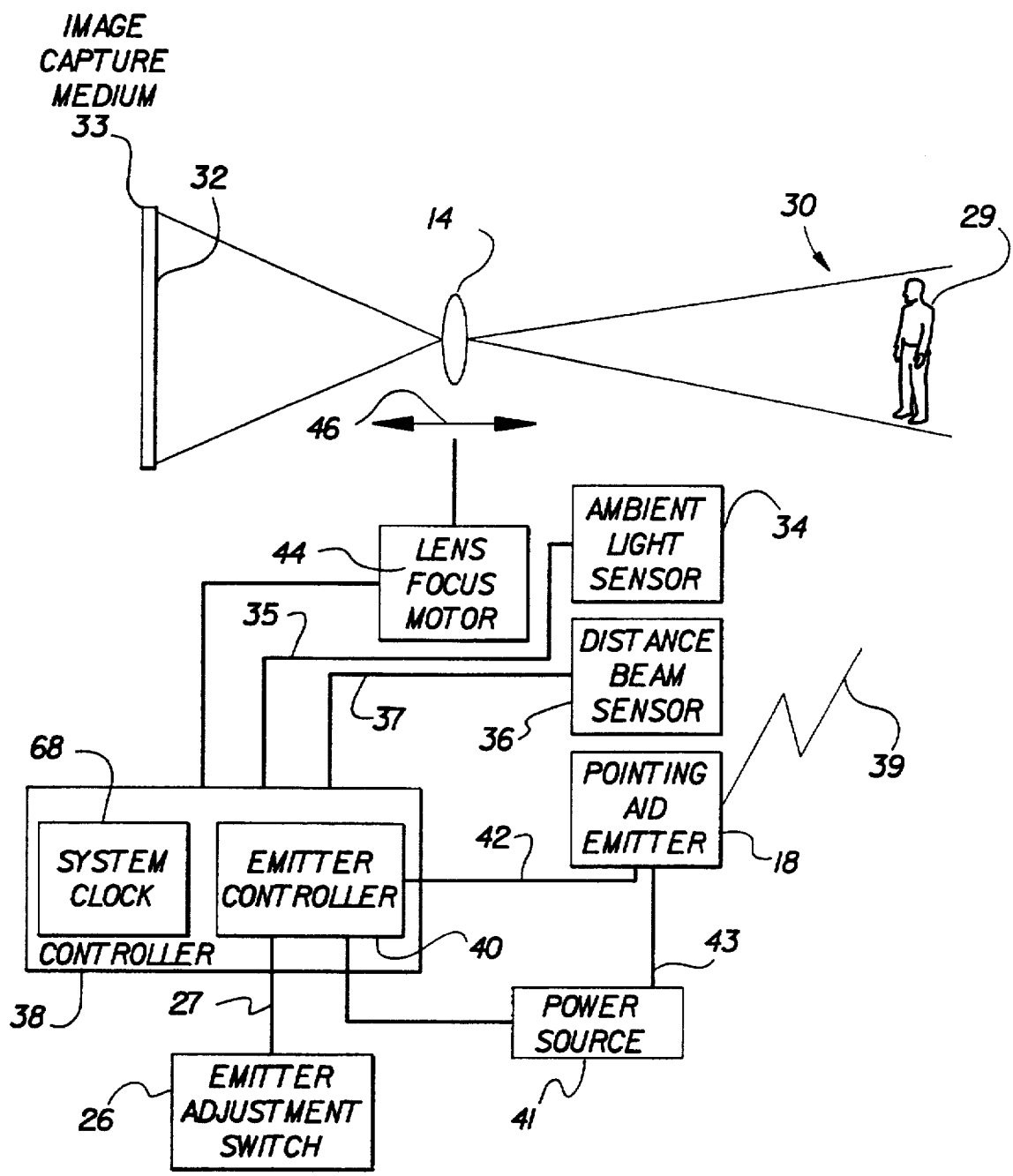
FIG. 2 is a schematic representation of the camera illustrated in FIG. 1.

FIG. 2 illustrates a preferred embodiment of the camera 10 illustrated in FIG. 1 and shows some of the camera elements in schematic representation. FIG. 2 shows that the camera has a field of view such that light from an object 29 in the ambient scene 30 enters the camera 10 through the objective lens 14 and is directed onto a focal plane 32 at which an image capture medium 33 is located. The image capture medium can comprise, for example, electronic photoreceptors such as photodiodes in an array for digital representation of the captured image or can comprise a silver-halide filmstrip or plate that is exposed and then developed.

In the preferred embodiment, the scene measuring system 20 measures both ambient light level and camera-to-object distance. Thus, the scene measuring system of the camera 10 includes an ambient light sensor 34 that receives and measures ambient light from the scene 30 and includes a distance beam sensor 36 that receives light reflected off the object 29. The reflected light preferably comprises light that is first emitted from the camera 10, reflected off the object, and then received back at the camera by the sensor. The reflected light is used to determine the distance from the camera to the object. In the preferred embodiment, the ambient light sensor and distance beam sensor are shared with an automatic exposure system of the camera and an automatic focus system of the camera, respectively. Thus, the ambient light sensor 34 comprises part of an automatic exposure system that sets exposure parameters such as lens diaphragm diameter and shutter open time and the distance beam sensor 36 comprises part of an automatic focus system that determines camera-to-object distance and controls lens focus setting. Accordingly, the pointing aid emitter 18 preferably comprises the emitter of the automatic focus system, wherein the pointing aid emitter beam is received by the distance beam sensor 36 and is used to determine distance to the object 29. Thus, the pointing aid can be an integral part of the focus setting system. Alternatively, the beam for the pointing aid and the beam for the automatic focus system can be produced by two separate emitters.

A camera controller 38 receives ambient light level information from the ambient light sensor 34 and receives distance information from the distance measuring sensor 36 over an ambient signal line 35 and a distance signal line 37, respectively. The controller includes an emitter controller 40 that controls a power source 41 and controls the emitter 18 via a signal line 42 to adjust the beam output power in accordance with the ambient light level and the distance to the object information received over the signal lines 35, 37. As described further below, in the preferred embodiment, the emitter is pulsed on and off sufficiently fast that the beam is perceived to be steadily illuminated and the beam output power is controlled by controlling the duty cycle of the emitter. The power source 41 provides illuminating power to the emitter 18 via a power connection 43 and can comprise, for example, a camera battery that also is used to power other camera systems. FIG. 2 shows that the camera controller 38 includes an automatic focus setting system that uses the distance information to control a lens focus motor 44 and adjust the focus of the objective lens 14, as indicated by the arrows 46.

Generally, the beam output power is increased with the distance to the object 29. Under some conditions, however, the pointing aid beam 39 might not be readily visible on an object 29 regardless of the distance. For example, the ambient light level might be so great that the ambient light will overwhelm the pointing aid beam and prevent the beam from being visible on the object at any useful camera-to-object distance. Accordingly, the emitter controller 40 prevents operation of the emitter 18 if the measured ambient light level exceeds a predetermined value. This automatic shut-off conserves power from the power source 41.

As described further below, the emitter controller 40 also prevents operation of the emitter 18 at distances less than a minimum operating distance and greater than a maximum operating distance. The minimum operating distance is selected to be a minimum camera-to-object distance at which acceptable image capture takes place, due to the minimum lens focus distance and acceptable blur circle. The maximum operating distance is selected according to the distance and light levels at which the light beam will not be visible on the object. The maximum operating distance can vary with the ambient light level and therefore, as noted above, in the preferred embodiment the emitter controller makes use of information from both the automatic exposure system and the automatic focus system.

Figure 3:
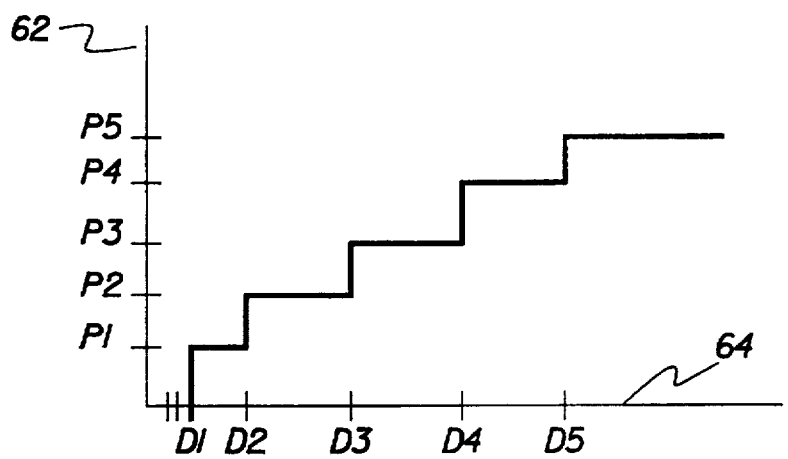
FIGS. 3, 4, and 5 are representations of the relationship between emitter output, ambient light level, and object distance.
Figure 4:
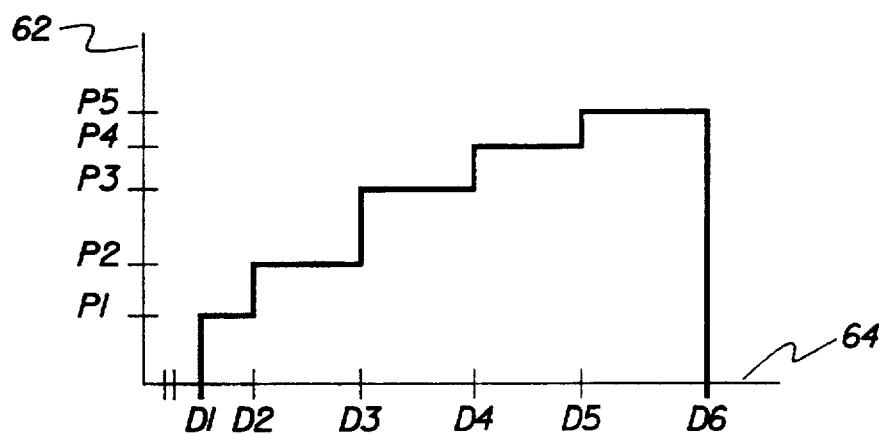
Figure 5:
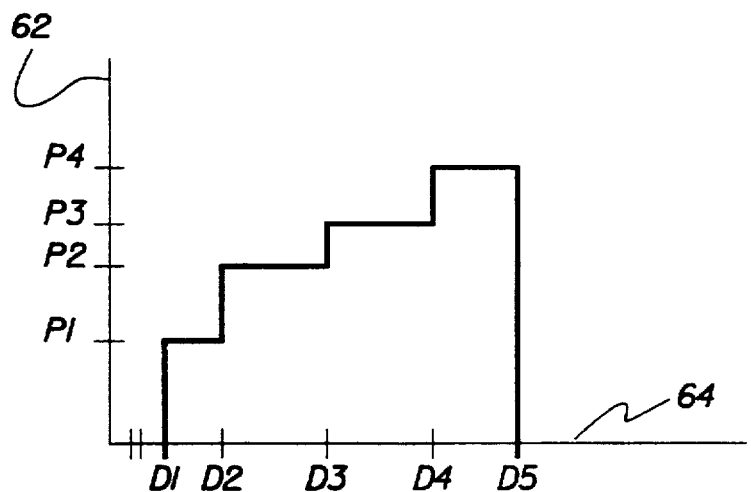

FIGS. 3, 4, and 5 are graphical representations of the relationship between emitter beam output power and object distance for low, medium, and high ambient light levels, respectively. FIGS. 3–5 illustrate a stair-step relationship between the power of the output beam and the distance to the object. Other types of power relationships, such as continuous, linear, or sinusoidal, will occur to those skilled in the art and may be implemented according to the particular camera and image capture medium intended for use. Those skilled in the art will understand how to implement such functions without further explanation.

FIG. 3 is a graph that shows the relationship between emitter beam output power on the vertical axis 62 and the distance to an object on the horizontal axis 64 for a low ambient light level. Standard techniques known to those skilled in the art can be used to measure the output power of the beam 39. FIG. 3 shows that the distance-output power relationship is a generally increasing one, wherein the output power of the beam is steadily increased with distance up to a maximum output power value indicated by P5. Thus, FIG. 3 shows that the farther an object is from the camera, the more beam output power is permitted by the emitter controller 40. This relationship ensures that under a low ambient light condition a camera user will perceive a beam of relatively equal brightness on an object regardless of the distance from the camera to that object.

A stair-step relationship between object distance and beam output power as depicted in FIG. 3 is selected because it is easier to implement than the alternative relationships. Thus, camera-to-object distance as detected by the camera is divided into multiple distance intervals, and the beam output power within each distance interval is the same. In this way, beam output power is changed only when a distance interval is changed. This reduces the number of data points that must be implemented by the emitter controller 40 and makes design of the system easier. In the illustrated embodiment, five distance intervals are used. Those skilled in the art will appreciate that a more nearly continuous relationship, such as a linear relationship or sinusoidal relationship, would be more complicated to implement in terms of the number of data points required.

In the preferred embodiment, the emitter 18 (FIG. 2) is not operated if an object is closer to the camera 10 than a minimum operating distance D1. As noted above, the minimum operating distance comprises a minimum distance for acceptable image capture. For example, if the camera 10 is a fixed-focus camera, the minimum acceptable image distance typically is approximately four and one-half feet (1.5 meters). The minimum operating distance also is set according to a minimum safe emitter operating distance. For example, if the emitter 18 produces a laser beam, then objects or persons in the scene might be harmed by the beam if they are sufficiently near the emitter. Preferably, the output power of the emitter is controlled so that the minimum operating distance is equal to the minimum lens focus distance.

In the FIG. 3 graph, the minimum operating distance is indicated by D1. The dashed lines on the distance axis 64 indicate compression of the distance scale for purposes of illustration. FIG. 3 illustrates that, for distances less than D1, the emitter is not operated. Thus, the absence of the pointing aid beam is an indication to the camera user that the camera is closer to the object than the minimum focus distance of the objective lens and that the user should increase the distance to obtain an acceptable image. Rather than turning off the emitter beam, the system can take other action, such as flashing the beam on and off at perceptible intervals. Turning the beam off, however, conserves battery power.

Thus, for the low ambient light level illustrated in FIG. 3, the stair-step relationship between object distance and beam output power begins at the minimum operating distance D1 with a beam output power level of P1. In accordance with a stair-step relationship, the output power level is constant for a first distance interval that extends from D1 to a second distance D2. A second distance interval extends from the distance D2 to a distance D3, during which output power is constant at a level of P2. This type of output power function is repeated for a third distance interval defined by D3 to D4 at output power level P3, a fourth distance interval defined by D4 to D5 at output power level P4, and a fifth distance interval defined by distance D5 to D6 at output power level P5. The output power level P5 represents a maximum output power level for the low ambient light level.

FIG. 4 is a graph that illustrates the relationship between beam output power and distance under a condition of medium light level. Again, beam output power is shown along the vertical axis 62 and camera-to-object distance is shown along the horizontal axis 64. The emitter controller 40 implements the power-distance relationship to ensure that under a medium brightness condition a camera user will perceive a beam of relatively equal brightness on an object regardless of distance to the object. FIG. 4 shows that the output power rises relatively slowly until a certain distance D3 is achieved, and then rises relatively quickly to the maximum power level P5. Again, five distance intervals are used. It should be noted that the distances D1, D2, . . . , D5 illustrated in FIG. 4 do not necessarily coincide with the distances D1, D2, . . . , D5 illustrated in FIG. 3, and likewise for the beam output power levels P1, P2, . . . , P5. In particular, it should be noted that the initial output power level P1 is greater under medium ambient light level (FIG. 4) than the output power level P1 under low ambient light level (FIG. 3). In this way, the user perceives a beam of equal brightness on the object regardless of distance and ambient light level.

FIG. 4 shows that a minimum operating distance D1 also is implemented for the medium ambient light level. Thus, the pointing aid beam is not operated at camera-to-object distances less than D1. In the preferred embodiment, the pointing aid system also includes a maximum operating distance shut-off feature that halts operation of the beam when it is likely the beam will not be readily visible on the object. That is, under a medium ambient light level, the pointing aid beam 39 most likely will not be visible at distances greater than a maximum operating distance indicated in FIG. 4 by the distance D6. At distances greater than D6, the ambient light level overwhelms the pointing aid beam, which cannot be readily discerned by most users. It would be wasteful to provide power to the emitter 18 at such distances. Therefore, FIG. 4 illustrates that the emitter is not operated at distances greater than D6. In this way, the power source 41 is not unnecessarily drained.

FIG. 5 illustrates the relationship of beam output power to distance under a high ambient light level. FIG. 5 shows that under bright light the beam output power rises relatively quickly, especially after a point D2, to a maximum power output level P4. FIG. 5 shows that the emitter is not operated after a maximum distance D5, which is less than the maximum operating distance D6 illustrated in FIG. 4. This reduced maximum operating distance occurs because, under high ambient light levels, the pointing aid beam is quickly overwhelmed by the ambient light and is not readily visible on the object. With regard to beam visibility under the high ambient light condition, it should be noted that the initial output power level P1 of FIG. 5 is greater than the corresponding initial output power level P1 for the other two light level graphs FIG. 3 and FIG. 4, again owing to the need to overcome ambient light to produce a visible beam. It also should be noted that only four distance intervals are used under the high ambient light level condition of FIG. 5 and only four output power levels are used as well, owing to the early turn-off of the emitter.

As noted above, an optional adjustment switch 26 can be provided for a camera user to adjust beam output power. The switch preferably is implemented so that the switch controls the maximum power output level illustrated in FIGS. 3, 4, and 5. Thus, the switch 26 provides a control input to the emitter controller 40 via a signal line 27 through which the user can effectively modify the graphs illustrated in FIGS. 3, 4, and 5 to set the maximum permitted output power to a level not greater than that otherwise permitted by the illustrated graphs.

The control of beam output power can utilize a variety of techniques. In the preferred embodiment, the output beam is a laser beam and the method of controlling it is commonly referred to as a pulse width modulation technique. When the output beam is a laser beam, the maximum power output level is selected to be not greater than a value at which the beam would cause damage if it passed through the pupil of an observer's eye. The pulse width modulation technique reduces the power consumption for a perceived level of pointing aid beam brightness.

Figure 6:
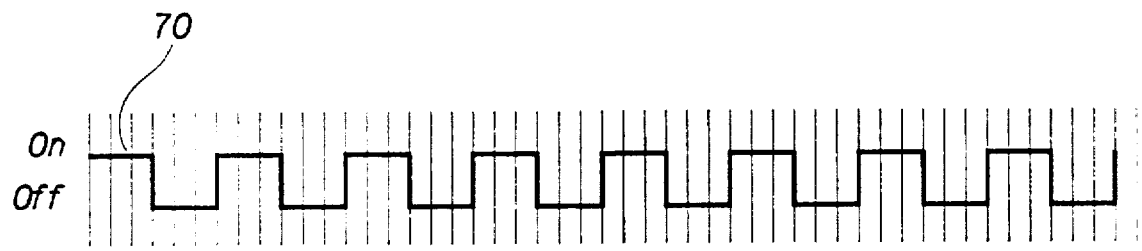
FIGS. 6, 7, and 8 are representations of a pulse width modulation technique for controlling the output power of the emitter.
Figure 7:
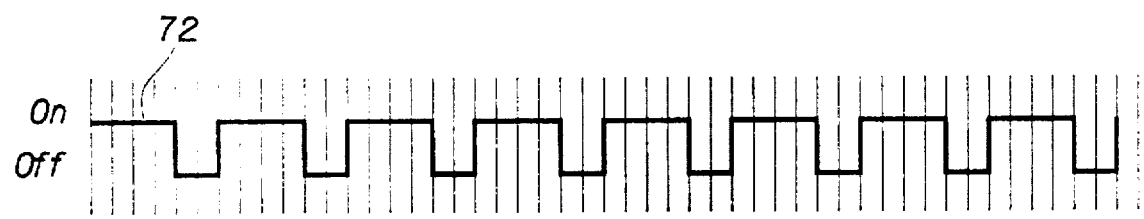
Figure 8:
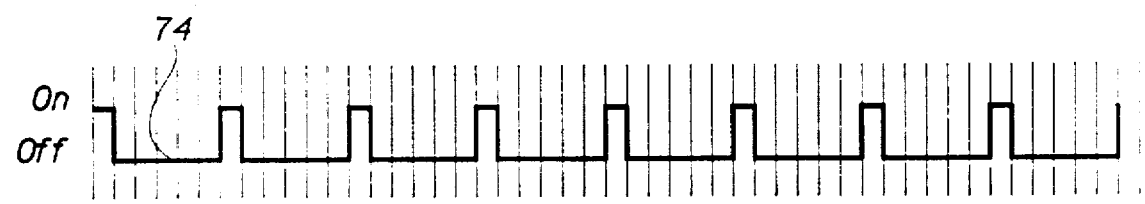

The pulse width modulation technique for controlling beam output power is illustrated in greater detail in FIGS. 6, 7, and 8. The pulse width modulation technique is used in conjunction with a system clock 68 of the camera 10 (FIG. 2). FIG. 6 shows a fifty percent duty cycle pulse signal 70 that turns the laser 18 on for three clock periods and then turns the laser off for three clock periods. FIG. 7 shows an increased output power pulse signal 72. Those skilled in the art will appreciate that the FIG. 7 pulse signal represents a beam of increased output power because the "on" time for the FIG. 7 pulse signal is increased over that of the FIG. 6 pulse signal. In particular, FIG. 7 shows a signal 72 in which the laser is turned on for four clock periods and then is turned off for two clock periods. Similarly, FIG. 8 illustrates a reduced beam output power pulse signal 74, in which the on period of the pulse signal is less than the on period of the pulse signal illustrated in FIG. 6. The precise duty cycles are selected based on the particular emitter used to provide desired output power while the user perceives the beam to have a constant brightness. In view of this description, those skilled in the art will appreciate other variations on pulse width duty cycle signals to control the output power of the beam as desired.

The system clock 68 illustrated in FIG. 2 conveniently permits a beam exposure limit for automatic shut-off of the emitter 18. This feature could be important, for example, if the emitter produces a laser beam and it is desired to limit the maximum time during which an object 29 in the scene 30 could be exposed to constant illumination, so that the risk of injury is controlled. When a camera user activates the emitter by pressing the image capture button 22, the emitter controller 40 uses the system clock to determine the length of time during which the user steadily presses the button. It is unlikely a user could fix the camera 10 such that the beam 29 were trained on the same spot for the entire duration of button pressing. Nevertheless, the emitter controller shuts off the emitter after a predetermined time interval of constant button pressing to limit the potential exposure time to the beam. This reduces the risk of injury due to excessive beam exposure and also conserves the power source 41. The emitter beam can be re-activated only after the user releases the image capture button.

Figure 9:
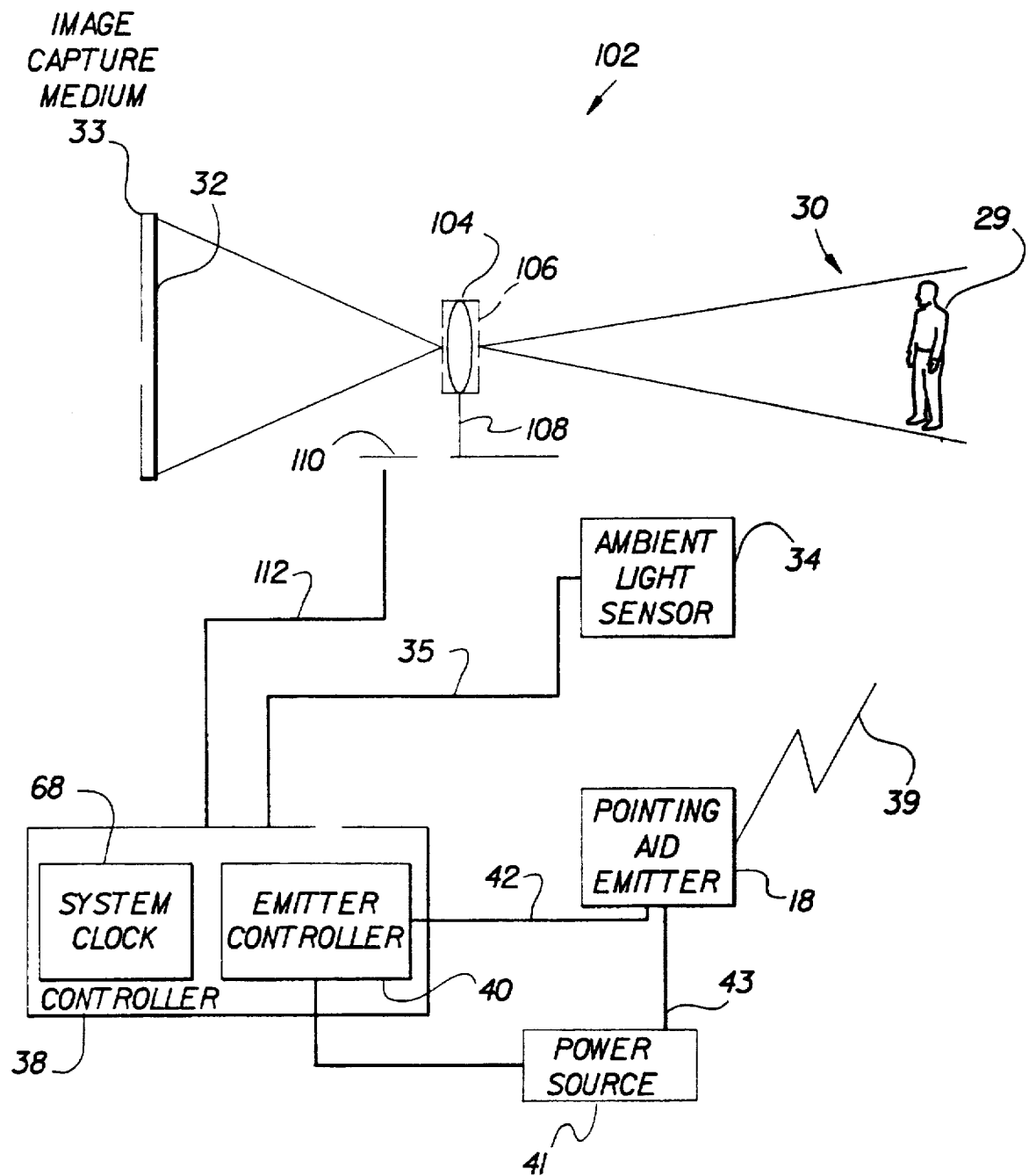
FIG. 9 is a schematic representation of an alternative camera constructed in accordance with the present invention.

The FIG. 2 embodiment of the camera 10 illustrated in FIG. 1 includes a pointing aid emitter 18 that is integrated with an automatic exposure system and automatic focus system of the camera. As noted, it is not necessary to include both systems in the camera and it is not necessary to control the pointing aid beam in accordance with both systems. FIG. 9 shows an alternative embodiment of the camera 10 in which the pointing aid beam is integrated with a camera automatic exposure system but is not integrated with any automatic focus or automatic distance measuring system of the camera. It should be noted that the camera of the FIG. 9 embodiment may or may not include automatic focus or automatic distance measuring. In either case, the pointing aid beam operates independently of such systems.

In particular, the FIG. 9 camera embodiment includes a mechanically adjustable lens 104 that a user adjusts in accordance with the viewfinder 16 (FIG. 1) image of the object 29 on which the user would like to obtain a photograph. The adjustable lens, for example, can contain a focus ring 106 that the camera user rotates until the image appearing through the camera viewfinder is in focus. The distance to the object as indicated by the adjustable lens is used by the pointing aid system to control the beam output power. Preferably, the adjustable lens 104 includes a brush contact 108 that moves along an encoder strip 110 to thereby produce a signal that indicates the focus setting of the lens to the camera controller 38 over a lens setting signal line 112. The focus setting of the lens thereby indicates the distance from the camera to the object 29.

The emitter controller 40 of the FIG. 9 embodiment receives the distance information from the adjustable lens 104 and receives ambient light information from the automatic exposure system ambient light sensor 34. The emitter controller accordingly adjusts the power provided to the emitter 18 from the power source 41. Again, the output power of the emitter beam is adjusted so that the beam remains visible under a variety of ambient lighting conditions with minimal power consumption and reduced risk of damage to an object or person in the scene.

Thus, a camera constructed in accordance with the present invention emits a pointing aid beam that can assist a camera user in pointing the camera to capture the image of an object of interest with or without using a viewfinder. The output power of the beam is controlled so that the user perceives a beam of generally equal brightness over variations in ambient light and camera-to-object distance, with minimum power consumption, and reduced risk of damage or injury.

The present invention has been described above in terms of presently preferred embodiments so that an understanding of the present invention can be conveyed. There are, however, many configurations for camera pointing aids not specifically described herein, but with which the present invention is applicable. The present invention should therefore not be seen as limited to the particular embodiments described herein, but rather, it should be understood that the present invention has wide applicability with respect to camera pointing aids generally. All modification, variations, or equivalent arrangements that are within the scope of the attached claims therefore should be considered within the scope of the invention.

The following elements and their corresponding reference numerals are used in the drawings:
camera 10
camera body 12
objective lens 14
viewfinder 16
pointing aid emitter 18
objective lens optical axis 19
scene measuring system 20
image capture button 22
flash unit 24
emitter adjustment switch 26
adjustment switch signal line 27
object 29
ambient scene 30
focal plane 32
image capture medium 33
ambient light sensor 34
ambient signal line 35
distance beam sensor 36
distance signal line 37
camera controller 38
pointing aid beam 39
emitter controller 40
power source 41
emitter control signal line 42
power connection 43
lens focus motor 44
power line 45
arrows 46
beam output power vertical axis 62
distance to an object horizontal axis 64
system clock 68
fifty percent duty cycle pulse signal 70
increased output power pulse signal 72
reduced beam output power pulse signal 74
adjustable lens 104
focus ring 106
brush contact 108
encoder strip 110
lens setting signal line 112

I claim:

1. A camera comprising:

a camera body;

an objective lens that receives light from a scene and directs it to an objective lens focal plane in the camera body;

a pointing aid emitter that receives power and produces a visible beam oriented generally along the optical axis of the objective lens such that the visible beam illuminates an object in the scene;

a scene measurement system that measures an aspect of the scene; and an emitter controller that adjusts the output power of the pointing aid emitter in accordance with the scene aspect measured by the scene measurement system to minimize power consumed by the emitter.

2. A camera as defined in claim 1, wherein the scene measurement system comprises a camera ambient light measurement system that measures ambient light in the scene.

3. A camera as defined in claim 2, wherein the pointing aid emitter comprises a visible-laser light source.

4. A camera as defined in claim 3, wherein the emitter controller adjusts the output power of the laser light source in accordance with the detected ambient light level.

5. A camera as defined in claim 4, wherein the camera ambient light measurement system comprises a camera automatic exposure system.

6. A camera as defined in claim 1, wherein the scene measurement system comprises a camera distance measurement system that determines the distance from the camera to an object in the scene.

7. A camera as defined in claim 6, wherein the emitter controller operates the emitter to flash the beam on and off at perceptible intervals at camera-to-object distances less than a minimum operating distance.

8. A camera as defined in claim 6, wherein the pointing aid emitter comprises a visible-laser light source.

9. A camera as defined in claim 8, wherein the emitter controller adjusts the output power of the laser light source in accordance with the detected distance to a nearest object.

10. A camera as defined in claim 9, wherein the distance measurement system comprises a camera automatic focus system.

11. A camera as defined in claim 6, wherein the emitter controller prevents operation of the emitter at camera-to-object distances less than a minimum operating distance.

12. A camera as defined in claim 11, wherein the minimum operating distance corresponds to a minimum lens focus distance.

13. A camera as defined in claim 11, wherein:

the camera further includes an ambient light measurement system that measures the ambient light level in the scene; and the emitter controller prevents operation of the emitter when the measured ambient light level indicates that the pointing aid beam will not be visible on the object at camera-to-object distances greater than the minimum operating distance.

14. A camera as defined in claim 6, wherein the emitter controller prevents operation of the emitter at camera-to-object distances greater than a maximum operating distance.

15. A camera as defined in claim 14, wherein:

the camera further includes an ambient light measurement system that measures the ambient light level in the scene; and the maximum operating distance corresponds to a distance beyond which the emitter beam is not visible on the object for the measured ambient light level.

16. A camera as defined in claim 1, wherein:

the camera further includes an ambient light measurement system that measures the ambient light level in the scene; and the emitter controller prevents operation of the emitter when the measured ambient light level indicates that the pointing aid beam will not be visible on the object.

17. A camera as defined in claim 1, wherein:

the camera further comprises an image capture button that can be pressed to a first stop to initiate operation of the scene measurement system and can be pressed to a second stop to initiate an image capture operation; and the emitter controller provides power to the pointing aid emitter only when the image capture button is pressed to the first stop.

18. A camera as defined in claim 1, wherein the emitter controller adjusts the output power of the emitter beam in a stair-step fashion.

19. A camera as defined in claim 1, wherein the scene measurement system includes both a camera ambient light measurement system that measures ambient light in the scene and a camera distance measurement system that determines the distance from the camera to an object in the scene.

20. A camera as defined in claim 1, wherein:

the pointing aid emitter comprises a visible-laser light source; and the emitter controller adjusts the output power of the emitter beam using a pulse width modulation technique.

21. A camera as defined in claim 1, wherein the camera further includes a beam adjustment switch that permits the user to adjust the output power of the emitter beam.

22. A camera including:

a camera body;

an objective lens that receives light from a scene and directs it to an objective lens focal plane in the camera body;

a viewfinder through which a camera user views the scene;

a power source that provides illuminating power to the laser light source;

a laser light source that produces a visible laser beam generally aligned with the optical axis of the objective lens such that the beam illuminates an object in the scene;

an automatic exposure system that measures the ambient light level in the scene;

a camera automatic focus system that determines the distance from the camera to an object in the scene; and a laser controller that adjusts the output power of the laser light source in accordance with the detected distance to the object and the detected ambient light level to reduce the power consumption of the light source.

23. A camera as defined in claim 22, wherein the camera further includes:

an image capture button that can be pressed to a first stop to initiate operation of at least either the automatic exposure system or the automatic focus system and can be pressed to a second stop to initiate a picture-taking operation; and the laser controller provides power to the laser only when the image capture button is pressed to the first stop.

24. A camera as defined in claim 23, wherein the laser controller adjusts the output power of the laser beam in a stair-step fashion.

25. A camera as defined in claim 24, wherein the laser controller adjusts the output power of the laser beam using a pulse width modulation technique.

26. A camera as defined in claim 25, wherein the camera further includes a beam adjustment switch that permits the user to adjust the output power of the laser beam.

27. A camera as defined in claim 22, wherein the emitter controller prevents operation of the emitter at camera-to-object distances less than a minimum operating distance.

28. A camera as defined in claim 27, wherein the minimum operating distance corresponds to a minimum lens focus distance.

29. A camera as defined in claim 27, wherein the emitter controller prevents operation of the emitter when the automatic exposure system measures an ambient light level that indicates the pointing aid beam will not be visible on the object at distances greater than the minimum operating distance.

30. A camera as defined in claim 27, wherein the emitter controller prevents operation of the emitter at camera-to-object distances greater than a maximum operating distance.

31. A camera as defined in claim 30, wherein the maximum operating distance corresponds to a distance beyond which the emitter beam is not readily visible on the object for the measured ambient light level.

32. A camera as defined in claim 27, wherein the emitter controller prevents operation of the emitter when the ambient light level measured by the automatic exposure system indicates that the pointing aid beam will not be visible on the object.

33. A method of providing a camera pointing aid for assisting a camera user in pointing the camera so as to capture an image of an object in a scene through a camera objective lens, the method comprising the steps of:

detecting the pressing of an image capture button of the camera;

responding to the pressing of the button by emitting a visible-light output beam from an emitter such that the emitter beam is generally aligned with the optical axis of the objective lens and illuminates the object; and adjusting the output power level of the beam so as to minimize the power consumed by the emitter.

34. A method as defined in claim 33, wherein the step of adjusting the output power level includes the steps of:

determining the ambient light level in the scene; and adjusting the output power level of the beam as a function of ambient light level.

35. A method as defined in claim 24, further including the step of preventing operation of the emitter when the ambient light level indicates that the beam will not be visible on the object.

36. A method as defined in claim 33, wherein the step of adjusting the output power level further includes the steps of:

determining the distance from the camera to the object;

adjusting the output power level of the beam as a function of the camera-to-object distance.

37. A method as defined in claim 36, further including the step of preventing operation of the emitter when the camerato-object distance indicates that the beam will not be visible on the object for the ambient light condition.

38. A method as defined in claim 36, further including the step of preventing operation of the emitter at a camera-to-object distance less than a minimum operating distance.

39. A method as defined in claim 38, wherein the minimum operating distance corresponds to a minimum lens focus distance.

40. A method as defined in claim 36, wherein the emitter controller prevents operation of the emitter at camera-to-object distances greater than a maximum operating distance.

41. A method as defined in claim 36, wherein the step of adjusting the output power level comprises adjusting the output power level in a stair-step fashion in accordance with camera-to-object distance.

42. A method as defined in claim 41, wherein the step of adjusting the output power level comprises using a pulse width modulation technique to change the duty cycle of the beam.

43. A camera as defined in claim 7, wherein the minimum operating distance corresponds to a minimum lens focus distance.

* * * * *

UNITED STATES PATENT AND TRADEMARK OFFICE
CERTIFICATE OF CORRECTION

PATENT NO. : 5,546,156
DATED : August 13, 1996
INVENTOR(S) : Dale F. McIntyre

It is certified that error appears in the above-indentified patent and that said Letters Patent is hereby corrected as shown below:

Cover, [56] References Cited, line 11, "4,983,017" should read --4,963,017--

Col 12, line 56, "24" should read --34--

Signed and Sealed this

Twenty-eighth Day of October, 1997

Attest:

BRUCE LEHMAN

*Attesting Officer*  *Commissioner of Patents and Trademarks*